(12) United States Patent
Aronovich et al.

(10) Patent No.: US 8,949,543 B2
(45) Date of Patent: Feb. 3, 2015

(54) FILTERING OBSOLETE READ REQUESTS IN NETWORKED CLIENT-SERVER ARCHITECTURE

(71) Applicant: International Business Machines Corporation, Armonk, NY (US)

(72) Inventors: Lior Aronovich, Toronto (CA); Konstantin Mushkin, Toronto (CA); Oded Sonin, Omer (IL)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 13/789,907

(22) Filed: Mar. 8, 2013

(65) Prior Publication Data

US 2013/0191448 A1 Jul. 25, 2013

Related U.S. Application Data

(63) Continuation of application No. 12/958,196, filed on Dec. 1, 2010, now abandoned.

(51) Int. Cl.

| G06F 12/14 | (2006.01) |
|---|---|
| G06F 12/08 | (2006.01) |
| H04L 29/06 | (2006.01) |
| G06F 3/06 | (2006.01) |

(52) U.S. Cl.
CPC ............ G06F 12/0862 (2013.01); H04L 67/42 (2013.01); G06F 3/067 (2013.01); G06F 2212/163 (2013.01)
USPC ............................ 711/137; 711/133; 711/213

(58) Field of Classification Search
CPC .............................. G06F 12/0862; G06F 9/383
USPC .......................................... 711/137, 213, 133
See application file for complete search history.

(56) References Cited

U.S. PATENT DOCUMENTS

| 5,752,063 | A | 5/1998 | Deroo et al. |
|---|---|---|---|
| 6,161,162 | A | 12/2000 | Deroo et al. |
| 7,039,747 | B1 | 5/2006 | Mattur et al. |
| 7,325,051 | B2 | 1/2008 | Das et al. |
| 7,423,781 | B2 | 9/2008 | Morimoto et al. |
| 7,441,087 | B2 | 10/2008 | Hakura et al. |
| 7,542,986 | B2 | 6/2009 | Lubbers et al. |
| 8,295,475 | B2 | 10/2012 | Li et al. |
| 2002/0049753 | A1 | 4/2002 | Burrows |
| 2003/0065812 | A1 | 4/2003 | Beier et al. |
| 2004/0064577 | A1 | 4/2004 | Dahlin et al. |
| 2004/0123044 | A1 | 6/2004 | Franaszek |
| 2006/0104606 | A1* | 5/2006 | Shiina .............................. 386/46 |
| 2006/0165040 | A1 | 7/2006 | Rathod et al. |
| 2006/0184723 | A1 | 8/2006 | Sinclair et al. |
| 2006/0265572 | A1 | 11/2006 | Stempel et al. |
| 2007/0005904 | A1 | 1/2007 | Lemoal et al. |

(Continued)

*Primary Examiner* — Jae Yu
(74) *Attorney, Agent, or Firm* — Griffiths & Seaton PLLC

(57) ABSTRACT

Read messages are issued by a client for data stored in a storage system of the networked client-server architecture. A client agent mediates between the client and the storage system. A sequence identification (ID) value is conveyed by each of the read requests sent from the client agent to the storage system. The read requests, which are related to a specific data segment, that are being read sequentially by an execution thread in the client are assigned with an identical unique sequence ID value. A read request having the sequence ID value that is less recent than a most recent sequence ID value already seen by the storage system are discarded.

24 Claims, 9 Drawing Sheets

(56) References Cited

U.S. PATENT DOCUMENTS

| | | |
|---|---|---|
| 2007/0165838 A1 | 7/2007 | Li et al. |
| 2008/0140877 A1 | 6/2008 | Baba et al. |
| 2008/0147965 A1 | 6/2008 | Eriksson et al. |
| 2009/0063400 A1 | 3/2009 | Borkar et al. |
| 2010/0031000 A1 | 2/2010 | Flynn et al. |
| 2010/0191910 A1 | 7/2010 | Gates et al. |
| 2010/0262617 A1 | 10/2010 | Shinjo et al. |

* cited by examiner

FILTERING OBSOLETE READ REQUESTS IN NETWORKED CLIENT-SERVER ARCHITECTURE

CROSS-REFERENCE TO RELATED APPLICATIONS

This application is a Continuation of U.S. patent application Ser. No. 12/958,196, filed on Dec. 1, 2010.

FIELD OF THE INVENTION

The present invention relates in general to computers, and more particularly to apparatus, method and computer program product embodiments for filtering obsolete read requests in networked client-server architecture in a computing storage environment.

DESCRIPTION OF THE RELATED ART

When performing sequential read operations, a read-ahead mechanism improves the efficiency of the reading process by performing background read-ahead operations, which load data from a storage device into a memory based cache, and this data is then read directly from the cache in subsequent read operations. This enables to efficiently utilize the storage channels and devices, balance I/O access over time, and thus increase the efficiency of the overall read process. Specifically, when processing a read operation, rather than waiting for the data to be retrieved from the storage device, the data is generally already available in the read-ahead cache, and since cache access (which is commonly memory based) is faster than I/O access, the entire read process is more efficient.

SUMMARY OF THE INVENTION

A read-ahead mechanism is generally optimized for a sequential read use case. In the architecture considered in the following illustrated embodiments and claimed subject matter, several factors may reduce the efficiency of a read-ahead mechanism. Primarily, since it is assumed that messages may be reordered when passing through the network, messages may be received at the destination in a different order relative to that by which they were generated and sent. This may cause read and read-ahead messages issued sequentially by a client to appear non-sequential when received by a storage system. Specifically, these messages may appear to have gaps and read-behind behavior. Both of these behaviors may reduce the efficiency of a read-ahead mechanism operating in the storage system, since it is more difficult in such a situation to determine which data is most beneficial to reside in the read-ahead cache of the storage system.

In addition, as the client application moves from reading one storage segment to another, read-ahead messages issued by the client for previous segments may reach the storage system after read and read-ahead messages associated with the next segments have already been processed by the storage system. Processing the obsolete messages associated with the previous segments would be inefficient, since such processing consumes resources. Furthermore, processing such obsolete messages may divert the read-ahead mechanism operating in the storage system, to the previous segments, which also reduces the efficiency of the reading process.

In view of the foregoing, a need exists for mechanisms to address the above challenges. Accordingly, various embodiments for read-ahead processing in a networked client-server architecture by a processor device are provided. Read messages are grouped by a plurality of unique sequence identifications (IDs), where each of the sequence IDs corresponds to a specific read sequence, consisting of all read and read-ahead requests related to a specific storage segment that is being read sequentially by a thread of execution in a client application. The storage system uses the sequence id value in order to identify and filter read-ahead messages which are obsolete when received by the storage system, as the client application has already moved to read a different storage segment. Basically, a message is discarded when its sequence id value is less recent than the most recent value already seen by the storage system. The sequence IDs are used by the storage system to determine corresponding read-ahead data to be loaded into a read-ahead cache maintained by the storage system for each client application read session, wherein the read-ahead cache is logically partitioned into preceding and following logically sequential buffers for data processing. When advancing the data contents of the read-ahead cache, according to the way in which the read requests of the client application read session advance, the data is loaded into the following logical buffer beginning at an offset one byte after the end offset of the preceding logical buffer. As long as a sequential reading stream is maintained by a client application read session, which is deduced by observing the incoming and the maintained values of the sequence ID, then the read-ahead cache location in the data segment being read is advanced using the method broadly described above, and read requests are either processed from the contents of the cache, or retrieved from the storage device (if the data they reference is not fully contained in the cache). When a new sequential reading stream is identified, again deduced by observing the incoming and the maintained values of the sequence ID, then the cache's location in the data segment being read is modified based on the incoming read request's offset, and the requested data is provided from the cache.

Moreover, various embodiments are provided for filtering obsolete requests and read requests by a processor device in a computing environment. Read messages are issued by a client for data stored in a storage system of the networked client-server architecture. A client agent mediates between the client and the storage system. A sequence identification (ID) value is conveyed by each of the read requests sent from the client agent to the storage system. The read requests, which are related to a specific data segment, that are being read sequentially by an execution thread in the client are assigned with an identical unique sequence ID value. A read request having the sequence ID value that is less recent than a most recent sequence ID value already seen by the storage system are discarded.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
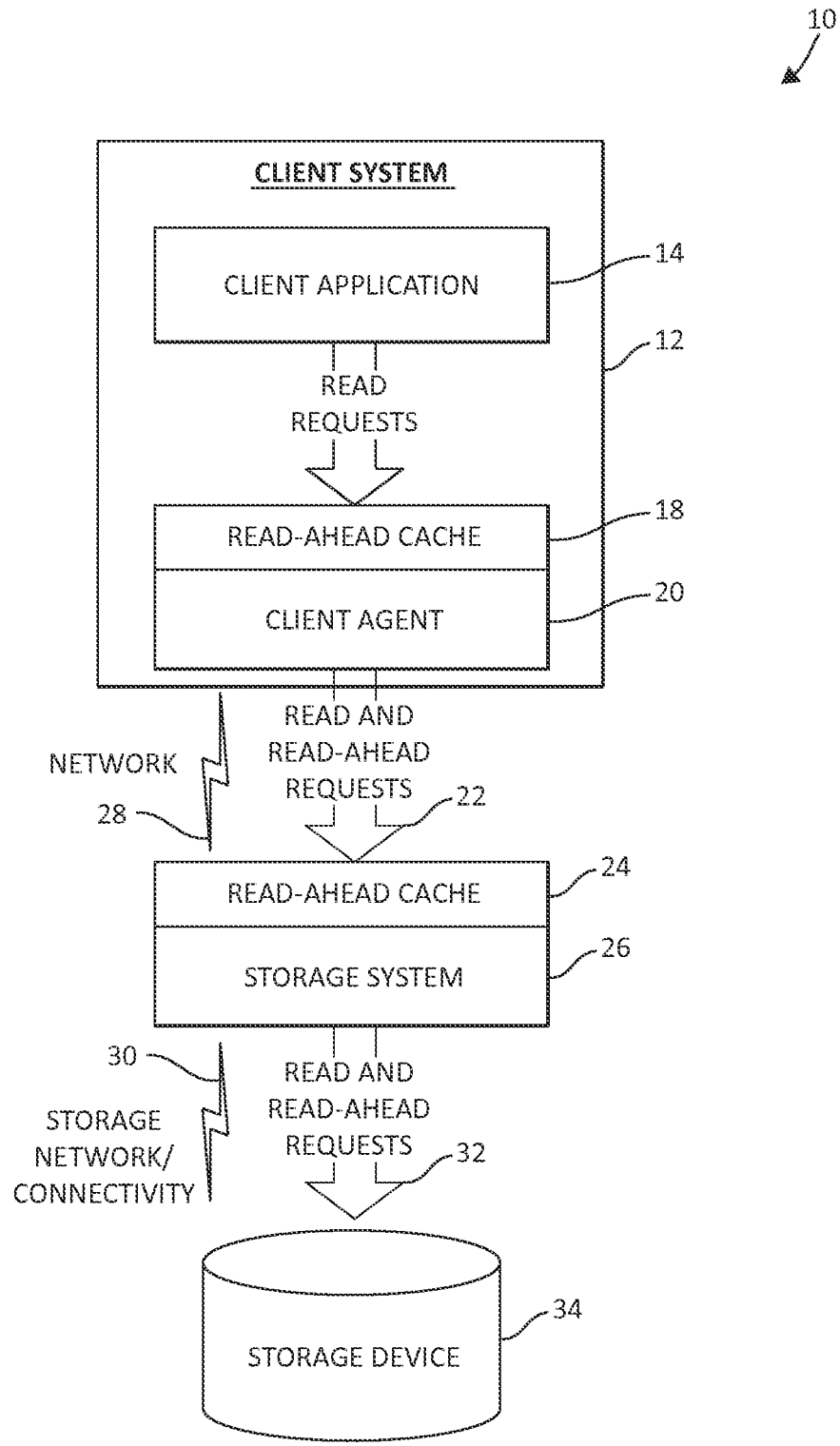
FIG. 1 illustrates an exemplary read-ahead architecture in a computing storage environment.

In the following illustrated embodiments, networked client-server architecture is considered, where a client application issues read requests for data stored in a storage system (which is the server in this architecture). The client application and the storage system are attached via network. FIG. 1 illustrates exemplary such networked client-server architecture 10. A client system 12 houses a client application 14, in which read requests are issued via a client agent 20, which resides locally relative to the client application (i.e. on the same processor), and employs a read-ahead cache 18. The client agent 20 is the agent of the storage system 26 on the processor running the client application 14. The client agent 20 (rather than the client application) communicates over the network 28 with the storage system 26.

The client agent 20 and the storage system 26 communicate using messages (e.g., read and read-ahead requests 22) over the network 28. As common to assume with regard to networks, it is assumed in this architecture that messages 22 may be reordered when passing through the network relative to their generation order. In architecture 10, both the client agent 20 and the storage system 26 may apply their own read-ahead mechanisms. Namely, the client agent 20 may produce read-ahead operations, based on the read requests issued by the client application 20, and store the read-ahead data in its own cache 18. Also, the storage system 26 may generate read-ahead operations, based on the read requests 22 received from the client agent 20, and store the read-ahead data in a dedicated cache 24. The storage system 26 utilizes storage network connectivity 30 to send read and read-ahead requests 32 to the storage device 32 as shown.

Although the read requests issued by the client application 14 are generally sequential by assumption (hence the benefit of the read-ahead mechanism in this context), the high level read pattern of the client application is assumed to be random. An example of such a read pattern would be an application that reads relatively large data sections, using sequential read operations of smaller sub-sections, from multiple storage entities (e.g. files), each independently stored in the storage system.

As previously mentioned, a read-ahead mechanism is generally optimized for a sequential read use case. In the architecture 10 considered in the illustrated embodiments, several factors may reduce the efficiency of a read-ahead mechanism. Primarily, since it is assumed that messages may be reordered when passing through the network, messages may be received at the destination in a different order relative to that by which they were generated and sent. This may cause read and read-ahead messages issued sequentially by the client agent to appear non-sequential when received by the storage system. Specifically, these messages may appear to have gaps and read-behind behavior. Both of these behaviors may reduce the efficiency of a read-ahead mechanism operating in the storage system, since it is more difficult in such a situation to determine which data is most beneficial to reside in the read-ahead cache of the storage system.

In addition, and again as previously mentioned, as the client application moves from reading one storage segment to another, read-ahead messages issued by the client agent for previous segments may reach the storage system after read and read-ahead messages associated with the next segments have already been processed by the storage system. Processing the obsolete messages associated with the previous segments would be inefficient, since such processing consumes resources. Furthermore, processing such obsolete messages may divert the read-ahead mechanism operating in the storage system, to the previous segments, which also reduces the efficiency of the reading process.

The illustrated embodiments, following, serve to efficiently address the above challenges. In the mechanisms of the illustrated embodiments, each read and read-ahead message sent from the client agent to the storage system conveys what will be referred to herein as a sequence id value, which groups read messages in a specific read sequence, such that all read and read-ahead requests which are related to a specific storage segment that is being read sequentially by a thread of execution in the client application are assigned with the same unique sequence id value, and are thus grouped together. The storage system uses the sequence id value in order to identify and filter read-ahead messages that are obsolete when received by the storage system, as the client application has already moved to read a different storage segment. Broadly, a message is discarded when its sequence id value is less recent than the most recent value already seen by the storage system.

In case the client agent's implementation of its read-ahead mechanism involves generating in each iteration a read-ahead request covering all the data required for loading into its read-ahead cache, while not considering previously issued read-ahead requests or responses to read-ahead requests which are currently being generated or sent, the mechanisms of the illustrated embodiments enable the storage system to efficiently process such read-ahead requests. Such an approach taken for the implementation of the client agent simplifies its implementation, and eventually enables the storage system to ensure that read accesses applied to the storage devices via its read-ahead mechanisms are practically serialized in terms of their offsets, thus enhancing the effectiveness of the read-ahead mechanisms used by the storage system. In this approach the read-ahead requests generated by the client agent may overlap in their data ranges, which in turn requires the storage system to filter and modify read requests also based on their requested data ranges.

Throughout the following description, a read session associated with a thread of execution in the client application is referred to as a client application read session. Pursuant to the mechanisms of the illustrated embodiments, the storage system maintains for each client application read session, the current farthest offset it has processed in the data segment being read (in addition to the maintained sequence id value). Generally, an incoming message is discarded by the storage system if the sequence id value of the read request specified by the message equals the maintained sequence id value and the end offset of the received read request is smaller than or equal to the maintained farthest offset. If the sequence id values are equal, and the end offset of the read request is larger than the farthest offset, then the farthest offset is modified to be the end offset of the read request, and the data range to read and send to the client agent is computed as the range starting from the previous value of the farthest offset plus one byte and ending at the new value of the farthest offset.

The storage system maintains a read-ahead cache for each client application read session, and uses the incoming and the maintained values of the sequence id to determine the data contents to be loaded into the read-ahead cache. The physical buffer constituting the read-ahead cache is logically partitioned into two buffers, which are always logically sequential in terms of their associated offsets in the data. Each of the logical buffers, regardless of their layout in the physical buffer, may be, in terms of their offsets in the data, the first logical buffer, and then the other buffer is the second logical buffer. The data content in the buffers is advanced according to the way in which the read requests of the client application read session advance. The data contents of the buffers can only move forward in the data segment being read, and does not backtrack. Advancement is triggered by exceeding a threshold on the number of read requests whose end offsets exceed a threshold offset in the second logical buffer, where the latter offset is defined based on a percentage of the data range covered by the second logical buffer. Upon activation of such advancement, the start offset of the first logical buffer is set to be the end offset of the second logical buffer plus one byte, and then data is loaded into the newly defined second logical buffer.

When processing an incoming read request, the data contents in both of the logical buffers is considered as a coherent data segment within a single buffer. An incoming read request, in one embodiment, is processed using the following method, as briefly described presently. As long as a sequential reading stream is maintained by a client application read session, which is deduced by observing the incoming and the maintained values of the sequence id, then the buffer's location in the data segment being read is modified only using the method broadly described above, and read requests are either processed from the contents of the buffer, or retrieved from the storage device (if the data they reference is not fully contained in the buffer). When a new sequential reading stream is identified, again deduced by observing the incoming and the maintained values of the sequence id, then the buffer's location in the data segment being read is modified based on the incoming read request's offset, and the requested data is provided from the buffer.

In the process of sending the data requested by a read operation to the client agent, the storage system partitions the returned data into multiple non-overlapping segments, and sends each segment in a separate network message. The storage system sends these response messages concurrently by multiple threads of execution and using multiple network connections (i.e. each response message may be sent using a different network connection), thus balancing the response messages over network connections. Due to this method, utilization of the network bandwidth between the storage system and the client agent is significantly improved. The client agent collects the response messages sent by the storage system, and forms the data of the read and read-ahead requests from the data segments conveyed in the response messages. Since network bandwidth is better utilized using the above method, the overall read performance is increased.

Read-ahead messages generated by the client agent may become obsolete, when a client application read session moves to read a different storage segment, and if these messages are received at the storage system after messages associated with the next segment were already processed by the storage system. Pursuant to the mechanisms of the illustrated embodiments, such messages may be filtered at the storage system using the following methodology.

Each read and read-ahead message sent from the client agent to the storage system conveys a sequence id value, which groups read messages in a specific read sequence, such that all read and read-ahead requests which are related to a specific storage segment that is being read sequentially by a thread of execution in the client application are assigned with the same unique sequence id value, and are thus grouped together. There is an order relation among the sequence id values. Sequence id values are generated by the client agent independently for each client application read session, and enable to determine the different storage segments that are being read sequentially by the session. Read and read-ahead requests are associated with a specific sequence id value, as long as the sequence id value is not modified based on the client agent logic specified next.

In one embodiment, the client agent generates a new sequence id value for a client application read session in the following cases: (1) there is no previous sequence id value for the session, or (2) a new sequential read flow is initiated by the session. A new sequential read flows may be, in one embodiment, identified by observing a gap in the current read flow (either a forward gap or a backward gap), as exemplified in FIG. 2, following. Specifically, a gap exists when the difference between the start offset of the new read request and the end offset of the latest read request is different than one byte (this difference may be positive or negative). Observing a move of the read session to read a different data entity in the storage (e.g. a different independent file), also identifies a new sequential read flow. Such an event is identified by observing the session using a new identifier of a storage entity.

Figure 2:
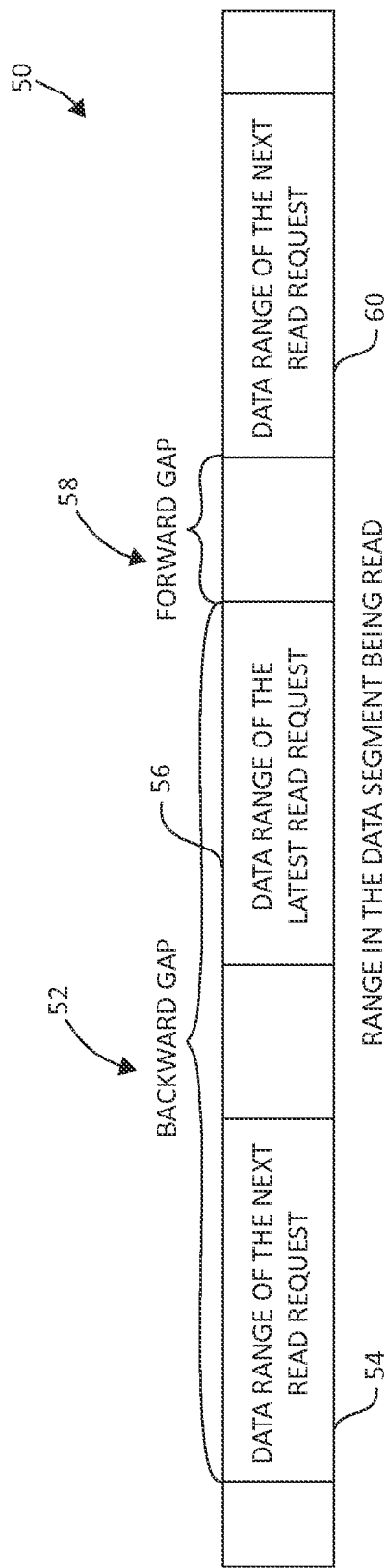
FIG. 2 illustrates gaps in a sequential read flow.

FIG. 2 depicts an exemplary range 50 in a particular data segment being read to illustrate gaps in sequential read flow. The data range of the next read request is exemplified to be either preceding 54 or following 60 the data range of the latest read request 56. In the first case, the read requests create a backward gap 52, and in the second case, the read requests create a forward gap 58.

Figure 3:
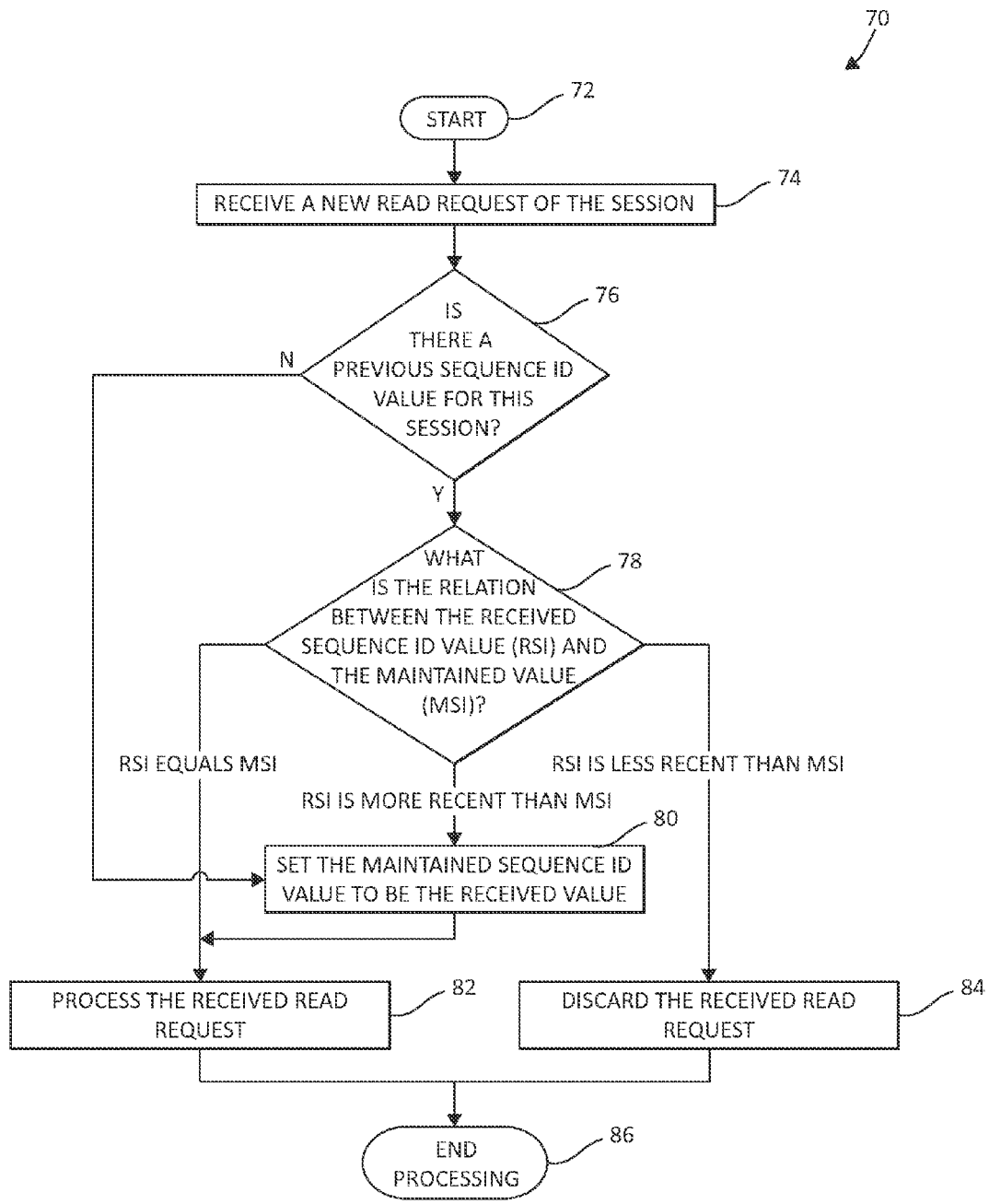
FIG. 3 illustrates an exemplary method for processing read requests considering incoming and maintained sequence ID values.

Turning now to FIG. 3, an exemplary method 70 for processing read requests by the storage system, applying read-ahead logic and considering the incoming and maintained sequence id values, is illustrated. For each client application read session, a current sequence id value is maintained by the storage system. The current sequence id value is initialized to a null value. For a newly received read request associated with a client application read session (step 74): if there is no previous sequence id value for this session (step 76), or if the received sequence id value is more recent than the maintained value (step 78), then the maintained value is set to be the value sent with the new read request (step 80), and the read request is further processed (step 82); if the received sequence id value equals the maintained value (again, step 78), then the maintained value is not changed, and the read request is further processed (step 82); and if the received sequence id value is less recent than the maintained value (again, step 78), then the associated read request and its sequence id value are discarded (step 84). The method 70 then ends (step 86).

In one embodiment, the client agent maintains a read-ahead cache for each client application read session to efficiently process read requests issued by the session. The client agent generates read-ahead requests to load data into its read-ahead cache. These requests are generated, and their responses from the storage system are processed, in an asynchronous (background) manner.

In a possible embodiment, the client agent records the farthest offset up to which it has issued read-ahead requests, and generates additional read-ahead requests from that offset further. In this embodiment, such read-ahead requests will not overlap in their data ranges, and thus the storage system processes the incoming read requests according to their ranges and does not have to filter or modify read requests due to overlapping ranges.

In another alternative embodiment, the client agent generates, in each iteration, a read-ahead request covering all the data required for loading into its read-ahead cache, while not considering previously issued read-ahead requests or responses to read-ahead requests that are currently being generated or sent. This approach simplifies the client agent implementation, and results in read-ahead requests generated by the client agent that may overlap in their data ranges. This requires the storage system to filter and modify incoming read requests also based on their requested data ranges. As a result of this processing, the storage system can ensure that read accesses applied to the storage devices via its read-ahead mechanisms, are practically serialized in terms of their offsets, thus enhancing the effectiveness of the read-ahead mechanisms used by the storage system. In this approach, the storage system filters and modifies read requests using the following methodology as illustrated in FIG. 4, following.

Figure 4:
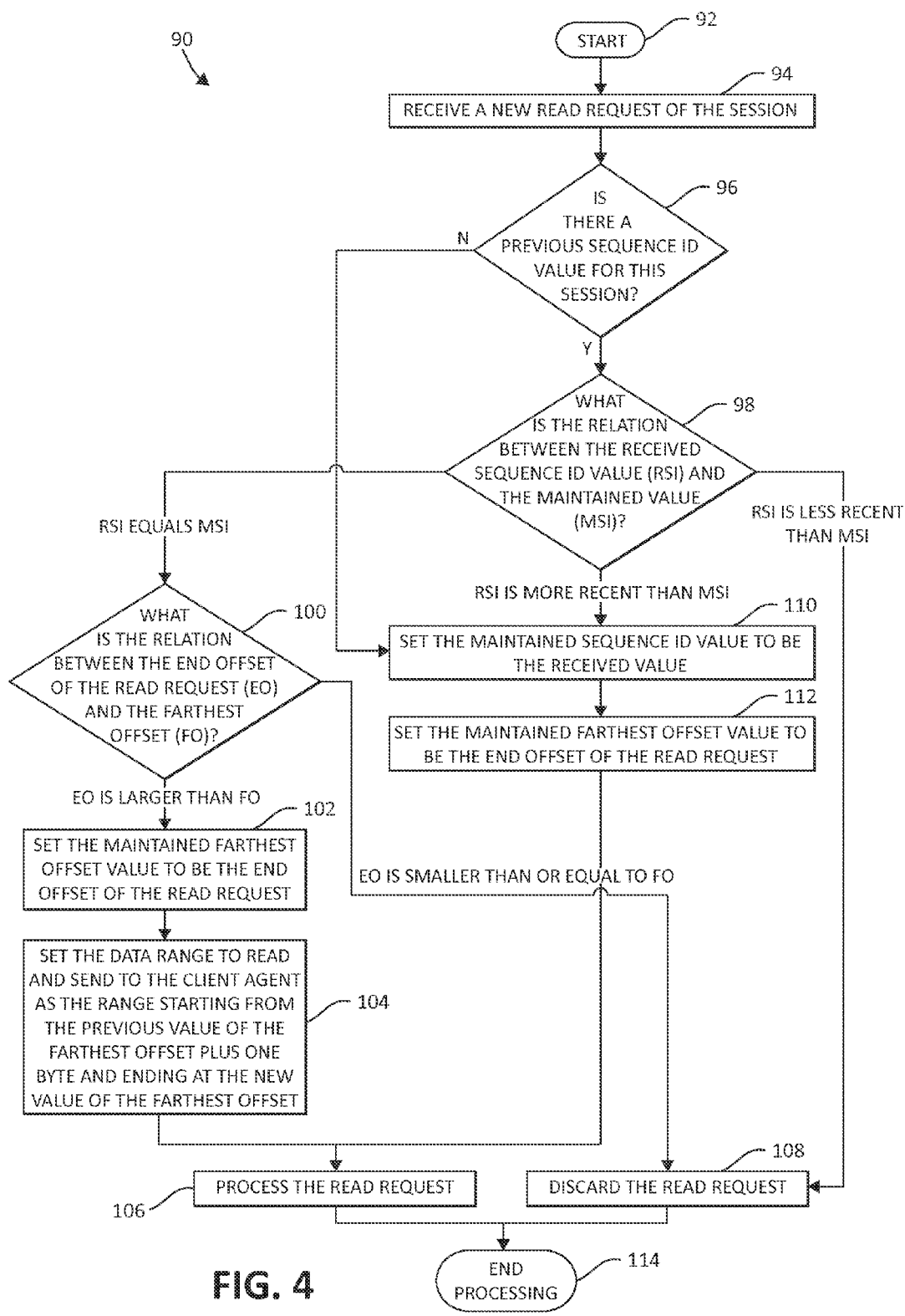
FIG. 4 illustrates an exemplary method for processing read requests considering incoming and maintained sequence ID values, and farthest offset values.
Figure 5:
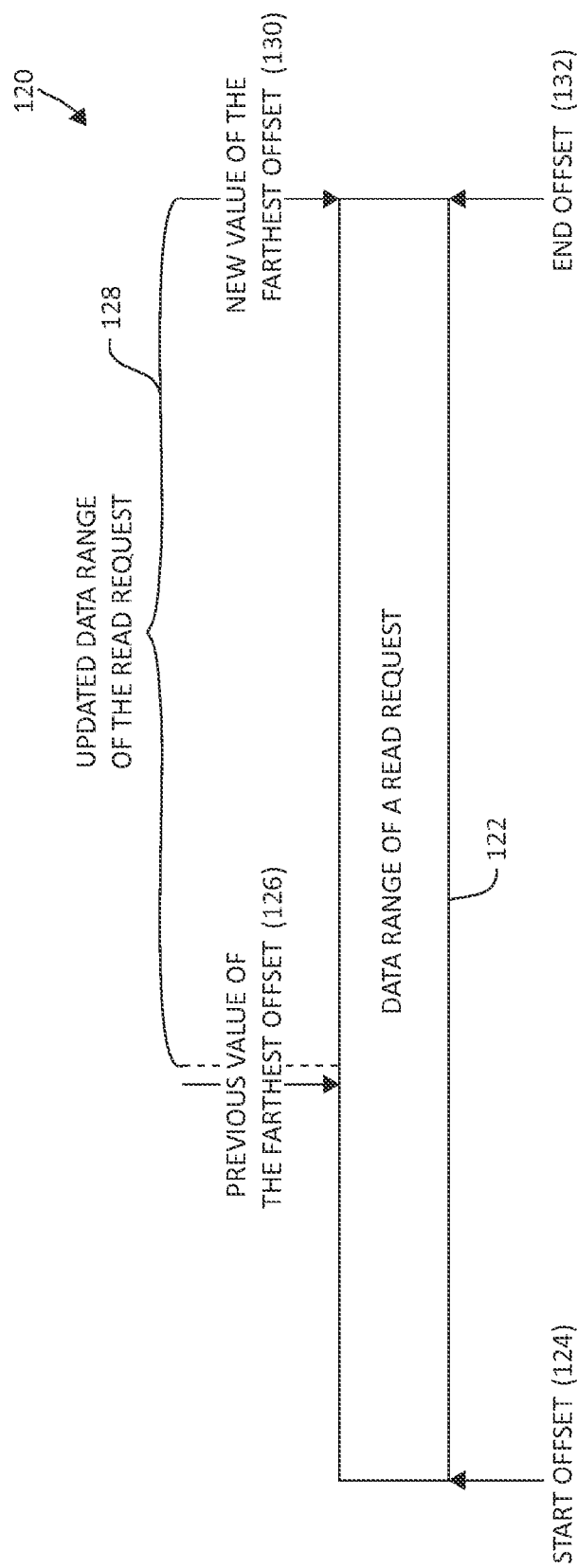
FIG. 5 illustrates exemplary computation of an updated data range of a read request using a farthest offset.

FIG. 4 illustrates an exemplary method 90 for processing read requests by the storage system considering incoming and maintained sequence ID values, and farthest offset values. The storage system maintains for each client application read session, the current farthest offset it has processed in the data segment being read. This value is initialized to null. This value is maintained in addition to the maintained sequence ID value. For a new read request received from a client application read session (step 94), if the sequence id value of the read request equals the maintained sequence id value (step 98) then: if the end offset of the read request is smaller than or equal to the farthest offset (step 100), then the request is discarded (since the requested range was already processed and sent to the client agent) (step 108). If the end offset of the read request is larger than the farthest offset (again, step 100), then the farthest offset is modified to be the end offset of the read request (step 102), and the data range to read and send to the client agent is computed as the range starting from the previous value of the farthest offset plus one byte and ending at the new value of the farthest offset (step 104). This computation 120 is shown in FIG. 5, following, where, for an exemplary data range 122 of a read request having a start offset 124 and an end offset 132, and a previous value of the farthest offset 126, result in an updated data range 128 of the read request ending at the new value of the farthest offset 130.

If the sequence id value of the read request is larger than the maintained sequence id value (again, step 98), or if there is no previous sequence id value for this session (step 96), then the maintained sequence id value is set to be the value sent with the new read request (step 110), the farthest offset is set to be the end offset of the new read request (step 112), and the read request is further processed, without any change to its range (step 106). If the sequence id value of the read request is smaller than the maintained value (again, step 98), then the associated read request and its sequence id value are discarded (again, step 108). The method 90 then ends (step 114).

Figure 6:
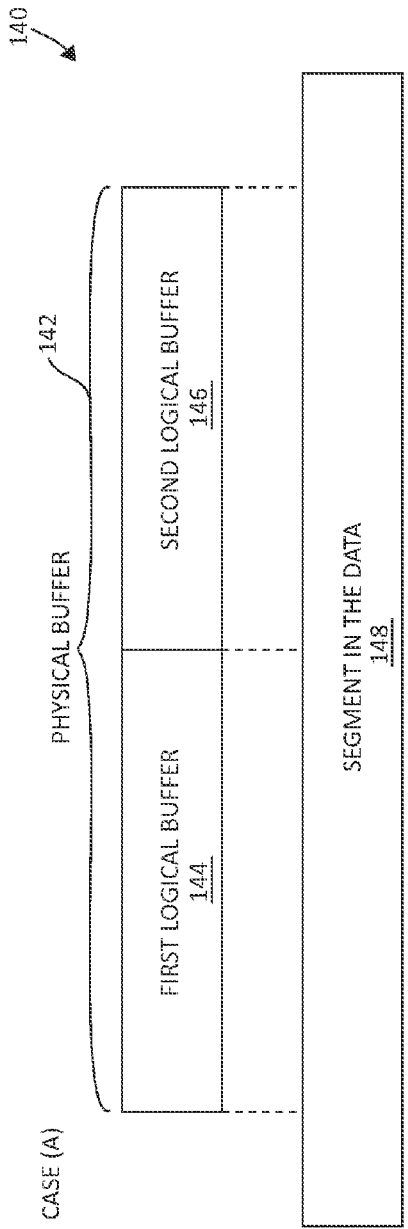
FIGS. 6 and 7 illustrate an exemplary layout of logical buffers in a physical buffer implemented as a read-ahead cache.
Figure 7:
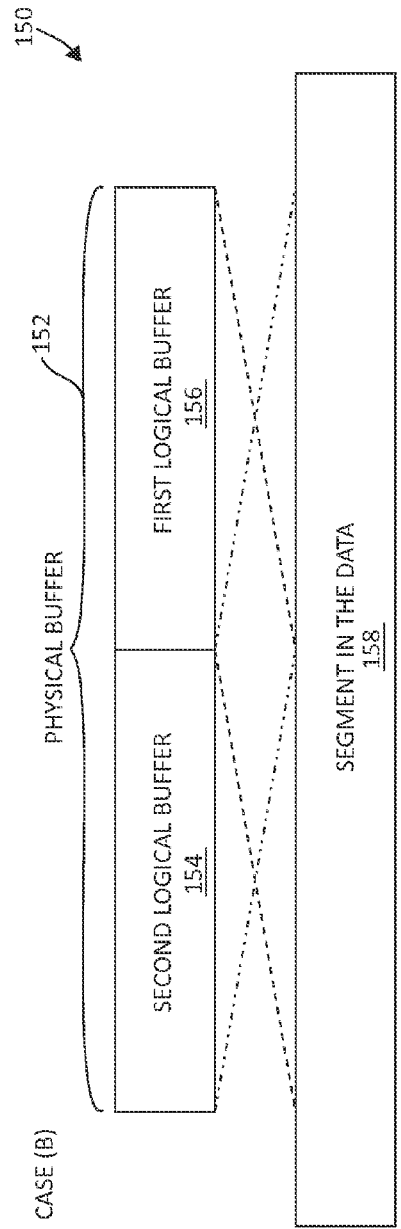

In one embodiment, the storage system maintains a read-ahead cache for each client application read session. The following is an exemplary methodology for determining the data contents to be loaded into the read-ahead cache, and the usage of the cache to process read requests. The physical buffer constituting the read-ahead cache is logically partitioned into two buffers, whose data content is determined using the following. The two buffers are always logically sequential, in terms of their associated offsets in the data. Namely, the start offset of the second logical buffer always starts one byte after the end offset of the first logical buffer. Each of the logical buffers, regardless of their layout in the physical buffer, may be, in terms of their offsets in the data, the first logical buffer, and then the other buffer is the second logical buffer. This partitioning 140, 150 of an exemplary data segment 148, 158 is illustrated in FIGS. 6 and 7, following, as Cases (A) and (B), respectively. The physical buffer 142, 152 is partitioned into a first and second logical buffers 144, 146 and 154, 156 as shown.

At initiation, when both logical buffers are empty, and when the first read request in a client application read session is processed, the following exemplary methodology may be applied. The start offset of one buffer (e.g. the buffer which is physically first in the physical buffer) is set to be the start offset of the read request. The start offset of the other buffer is set to be the end offset of the first buffer plus one byte. The data size to be loaded into the buffers is their total size (i.e. the size of the physical buffer). Data is loaded into both buffers (generally with a single read operation to the storage device). The incoming read request is supplied from the buffers.

The data contents in the buffers may be advanced according to the way in which the read requests of the client application read session advance, using, for example the following methodology. Advancing the data contents in the buffers is done by setting the start offset of the first logical buffer to be the end offset of the second logical buffer plus one byte. This switches between the first and the second logical buffers. Then data is loaded into the current second logical buffer (which was the previous first logical buffer).

Figure 8:
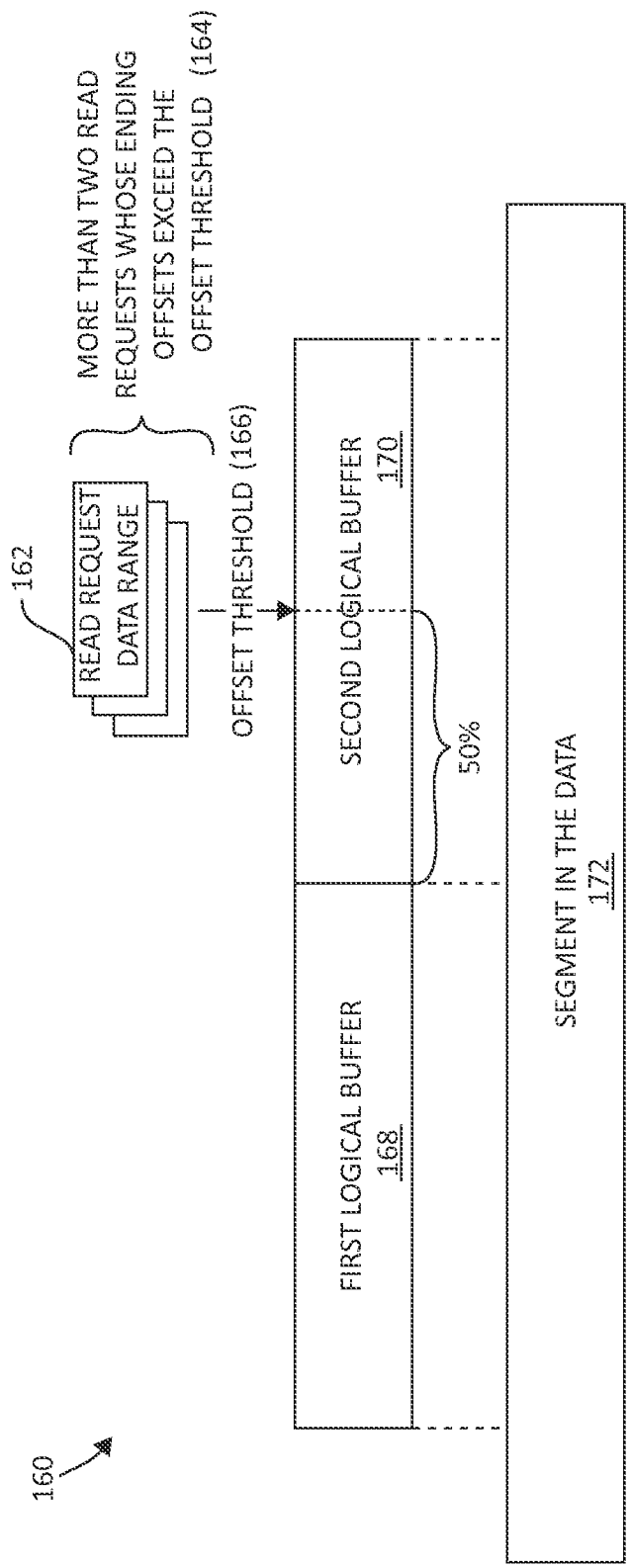
FIG. 8 illustrates an exemplary condition for triggering an advancement of data contents of the logical buffers first depicted in FIG. 6, based on predefined thresholds.

The trigger for advancing the data contents of the buffers using the exemplary methodology specified above, is that the number of read requests, whose end offsets exceed an offset threshold, exceeds a threshold of the number of such read requests. The offset threshold is recomputed whenever the data contents of the logical buffers change (i.e. the first and the second logical buffers are switched), and its value is correlated to a percentage of the data range covered by the second logical buffer. In our method this percentage is 50%, implying that when read requests start to refer to the second half of the second logical buffer, the data contents of the first logical buffer has low probability of being further accessed, and therefore the first logical buffer is advanced to become the second logical buffer. In one embodiment, the threshold for the number of such read requests is two. These thresholds 166 and the condition (e.g., more than two read requests 162 whose ending offsets exceed the offset threshold 164) for triggering an advancement of the data contents of the buffers 168, 170, for an exemplary data segment 172 are illustrated in FIG. 8, following, as shown.

In the process of advancing the data contents of the buffers, the loading of data into the newly defined second logical buffer is done in an asynchronous (background) process relative to the processing of the read requests. If any read request has to access the data that is in the process of being loaded into the second logical buffer, then this read request is blocked (using a synchronization mechanism) until the data is loaded and available in the second logical buffer.

Figure 9:
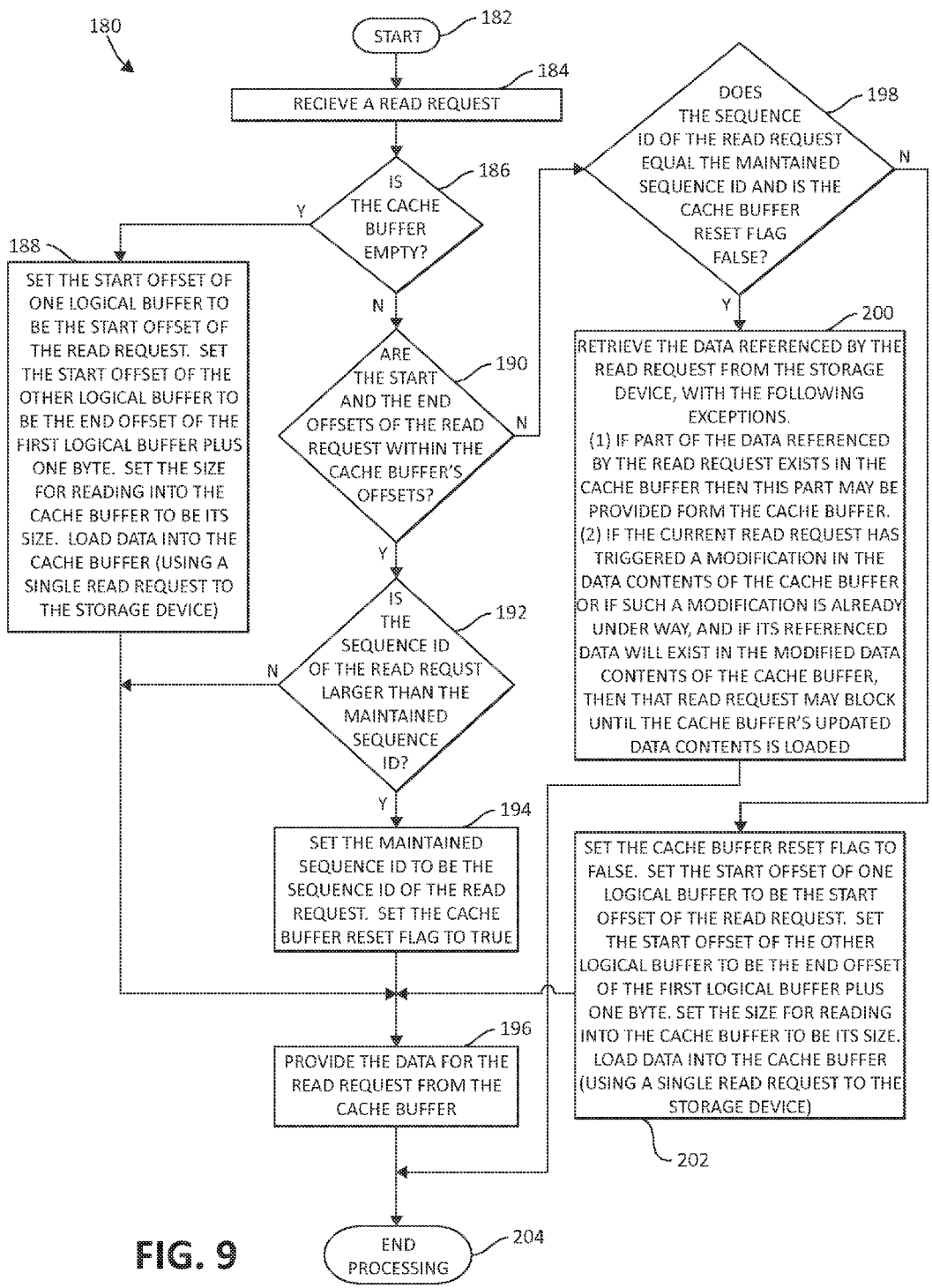
FIG. 9 illustrates an exemplary method for processing an incoming read request using a cache buffer.

When processing an incoming read request, the data contents in both of the logical buffers is considered as a coherent data segment within a single cache buffer. An incoming read request may, in one embodiment, be processed using the following method 180 shown in FIG. 9, following. Method 180 begins (step 182) with the receipt of a read request (step 184). If the cache buffer is empty (step 186), data is loaded into both logical buffers using the methodology described previously (step 188), and the data for the read request is provided from the cache buffer (step 196).

If the cache buffer is not empty (again, step 186), and if the start and the end offsets of the read request are within the cache buffer's offsets (step 190), the data for the read request is provided from the cache buffer (again, step 196). If the sequence id of the read request is larger than the current sequence id (step 192), then a flag is set indicating that upon the first subsequent read request that exceeds the cache buffer's range, the cache buffer will be reset (as specified in the following). The current sequence id is set to be the sequence id of that read request (step 194). If the sequence id of the read request is smaller than the current sequence id (again, step 192), then that read request was already discarded by the sequence id screening described previously.

If the cache buffer is not empty (again, step 186), and if the offsets of the read request exceed the offsets of the cache buffer (again, step 190), and if the sequence id of the read request equals the current sequence id and the flag indicating a cache buffer reset is off (indicating that it is still the same sequential read stream) (step 198), the data referenced by the read request is generally retrieved from the storage device, with the following exceptions. (1) If part of the data referenced by the read request exists in the cache buffer then this part may be provided from the cache buffer, and (2) if the current read request has triggered a modification in the data contents of the cache buffer or if such a modification is already under way, and if its referenced data will exist in the modified data contents of the cache buffer, then that read request may block until the cache buffer's updated data contents is loaded (step 200). Implied in the above is that read requests falling behind the data contents of the cache buffer are retrieved from the storage device (specifically their part not existing in the cache buffer is retrieved), and never wait for a modification in the cache buffer's contents (which always advances forward).

If the sequence id of the read request is larger than the current sequence id or the flag indicating a cache buffer reset is on (indicating that this is a new read stream) (step 198), the data contents of the cache buffer is updated using the following methodology. The start offset of one logical buffer is set to be the start offset of the read request; the start offset of the other logical buffer is set to be the end offset of the first logical buffer plus one byte; the size for reading into the buffers is their total size; and then data is loaded into the cache buffer (using a single read request to the storage device) (step 202). The flag indicating cache buffer reset is turned off (again, step 202). The read request is supplied from the cache buffer (step 196). Finally, if the sequence id of the read request is smaller than the current sequence id, the message is filtered at reception by prior processing (described previously). The method 180 then ends (step 204).

In the process of sending the data requested by a read operation to the client agent, the storage system partitions the returned data into multiple non-overlapping segments, and sends each segment in a separate network message. The storage system sends these response messages concurrently by multiple threads of execution and using multiple network connections (i.e. each response message may be sent using a different network connection), thus balancing the response messages over network connections. As a result, utilization of the network bandwidth between the storage system and the client agent is significantly improved. The client agent collects the response messages sent by the storage system, and forms the data of the read and read-ahead requests from the data segments conveyed in the response messages. Since network bandwidth is better utilized using the above mechanisms, the overall read performance is increased.

Figure 10:
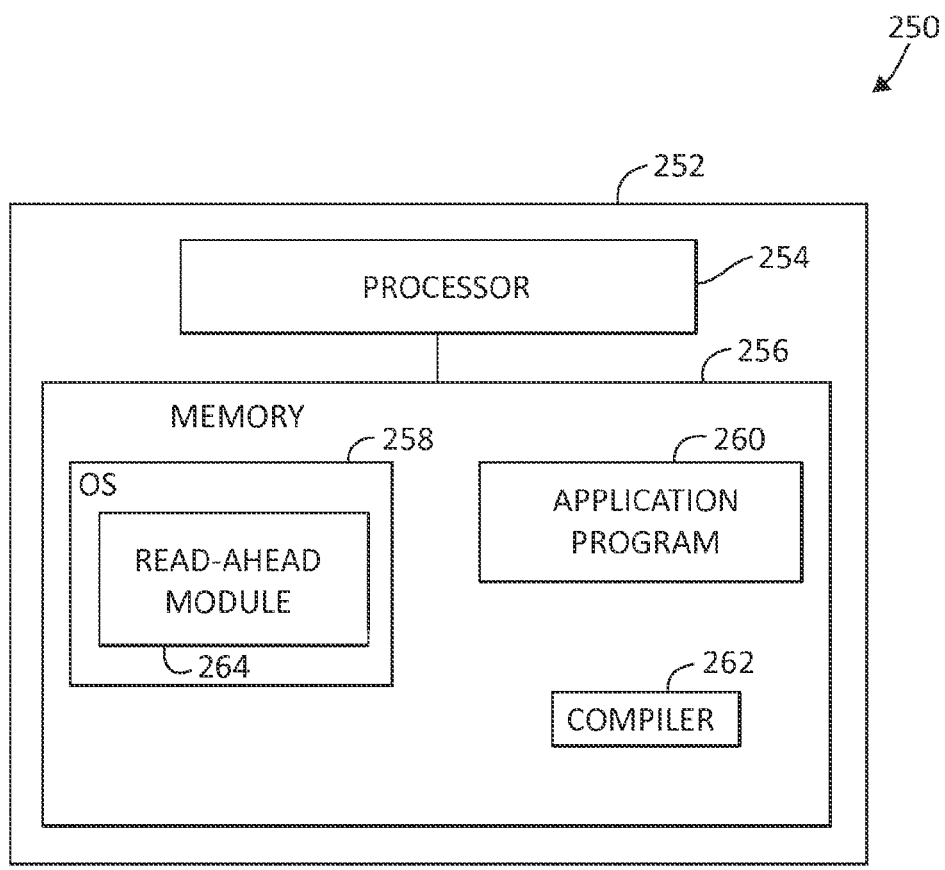
FIG. 10 illustrates exemplary hardware adapted for implementing aspects of the following claimed subject matter.

FIG. 10, following illustrates exemplary hardware 250 adapted for implementing aspects of the following claimed subject matter. In the depicted embodiment, an exemplary portion 252 of architecture 10 (FIG. 1) is illustrated. Portion 252 of architecture 10 is operable in a computer environment as a portion thereof, in which mechanisms of the foregoing illustrated embodiments may be implemented. It should be appreciated, however, that FIG. 10 is only exemplary and is not intended to state or imply any limitation as to the particular architectures in which the exemplary aspects of the various embodiments may be implemented. Many modifications to the architecture depicted in FIG. 10 may be made without departing from the scope and spirit of the following description and claimed subject matter.

Portion 252 includes a processor 254 and a memory 256, such as random access memory (RAM). The portion 252 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the portion 252.

In the illustrated embodiment, the portion 252 operates under control of an operating system (OS) 258 (e.g. z/OS, OS/2, LINUX, UNIX, WINDOWS, MAC OS) stored in the memory 256, and interfaces with the user to accept inputs and commands and to present results. In one embodiment of the present invention, the OS 258 facilitates read-ahead functionality according to the present invention. To this end, OS 258 includes a read-ahead module 264 which may be adapted for carrying out various processes and mechanisms in the exemplary methods described in the foregoing illustrated embodiments.

Portion 252 may implement a compiler 262 that allows an application program 260 written in a programming language such as COBOL, PL/1, C, C++, JAVA, ADA, BASIC, VISUAL BASIC or any other programming language to be translated into code that is readable by the processor 254. After completion, the application program 260 accesses and manipulates data stored in the memory 256 of the portion 252 using the relationships and logic that was generated using the compiler 262.

In one embodiment, instructions implementing the operating system 258, the application program 260, and the compiler 262 are tangibly embodied in a computer-readable medium, which may include one or more fixed or removable data storage devices, such as a zip drive, disk, hard drive, DVD/CD-ROM, digital tape, solid state drives (SSDs), etc. Further, the operating system 258 and the application program 260 may comprise instructions which, when read and executed by the portion 252, cause the portion 252 to perform the steps necessary to implement and/or use the present invention. Application program 260 and/or operating system 258 instructions may also be tangibly embodied in the memory 256. As such, the terms "article of manufacture," "program storage device" and "computer program product" as may be used herein are intended to encompass a computer program accessible and/or operable from any computer readable device or media.

Embodiments of the present invention may include one or more associated software application programs 260 that include, for example, functions for managing a distributed computer system comprising a network of computing devices, such as a storage area network (SAN). Accordingly, processor 254 may comprise one or more storage management processors (SMPs). The application program 260 may operate within a single computer or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for filtering obsolete read requests by a processor device in a networked client-server architecture, comprising:
   issuing read requests by a client for data stored in a storage system;
   mediating between the client and the storage system by a client agent;
   conveying a sequence identification (ID) value by each of the read requests sent from the client agent to the storage system, wherein the read requests which are related to a specific data segment that is being read sequentially by an execution thread in the client are assigned with an identical unique sequence ID value; and discarding a read request having the sequence ID value that is less recent than a most recent sequence ID value already seen by the storage system.

2. The method of claim 1, further including allowing for the client and the storage system to communicate in a network.

3. The method of claim 2, further including:
allowing the client agent to reside locally relative to a respective client of the client agent, and
mediating between the client and the storage system by the client agent by communicating with the storage system using a plurality of messages over the network.

4. The method of claim 3, further including reordering the plurality of messages while the plurality of messages are passing through the network relative to a generation order of the plurality of messages.

5. The method of claim 1, further including maintaining an order relation among sequence ID values.

6. The method of claim 5, further including generating the sequence ID values by the client agent for each one of a plurality of client read sessions, wherein each of the plurality of client read sessions is generated by a single execution thread in the client.

7. The method of claim 6, further including performing one of:
generating the sequence ID values by the client agent for one of the plurality of client read sessions if no previous sequence ID value exists for the one of the plurality of client read sessions, and
generating the sequence ID values by the client agent for one of the plurality of client read sessions according to one of a new sequential read flow that is initiated within the one of the plurality of client read sessions, the new sequential read flow that is identified by observing a gap in a current read flow, and observing usage of a new identifier of a storage entity.

8. The method of claim 7, further including processing the read requests by applying one of:
maintaining a current sequence ID value by the storage system for each one of the plurality of client read sessions, and
for a new read request that is received and associated with a client read session:
setting a maintained sequence ID value to be a value sent with the new read request if one of a previous sequence ID value does not exists for the one of the plurality of client read sessions, and a received sequence ID value is more recent than the maintained sequence ID value, wherein the read requests is processed,
processing the read request without changing the maintained sequence ID value if the received sequence ID value equals the maintained sequence ID value, and
discarding the associated read request and the sequence ID value of the associated read request if the received sequence ID value is less recent than the maintained sequence ID value.

9. A system for filtering obsolete read requests in a networked client-server architecture, comprising:
a storage system;
a client in association with the storage system;
a client agent in association with the storage system and the client; and
at least one processor device, operable in the in the networked client-server architecture, in communication with the storage system, wherein the at least one processor device:
issues read requests by the client for data stored in the storage system,
mediates between the client and the storage system by the client agent,
conveys a sequence identification (ID) value by each of the read requests sent from the client agent to the storage system, wherein the read requests which are related to a specific data segment that is being read sequentially by an execution thread in the client are assigned with an identical unique sequence ID value, and
discards a read request having the sequence ID value that is less recent than a most recent sequence ID value already seen by the storage system.

10. The system of claim 9, further including a network operable in the storage system, wherein the at least one processor device allows for the client and the storage system to communicate in the network.

11. The system of claim 10, wherein the at least one processor device performs each of:
allowing the client agent to reside locally relative to a respective client of the client agent, and
mediating between the client and the storage system by the client agent by communicating with the storage system using a plurality of messages over the network.

12. The system of claim 11, wherein the at least one processor device reorders the plurality of messages while the plurality of messages are passing through the network relative to a generation order of the plurality of messages.

13. The system of claim 9, wherein the at least one processor device maintains an order relation among sequence ID values.

14. The system of claim 13, wherein the at least one processor device generates the sequence ID values by the client agent for each one of a plurality of client read sessions, wherein each of the plurality of client read sessions is generated by a single execution thread in the client.

15. The system of claim 14, wherein the at least one processor device performs one of:
generating the sequence ID values by the client agent for one of the plurality of client read sessions if no previous sequence ID value exists for the one of the plurality of client read sessions, and
generating the sequence ID values by the client agent for one of the plurality of client read sessions according to one of a new sequential read flow that is initiated within the one of the plurality of client read sessions, the new sequential read flow that is identified by observing a gap in a current read flow, and observations of usage of a new identifier of a storage entity.

16. The system of claim 15, wherein the at least one processor device processes the read requests by applying one of:
maintaining a current sequence ID value by the storage system for each one of the plurality of client read sessions, and
for a new read request that is received and associated with a client read session:
setting a maintained sequence ID value to be a value sent with the new read request if one of a previous sequence ID value does not exists for the one of the plurality of client read sessions, and a received sequence ID value is more recent than the maintained sequence ID value, wherein the read requests is processed,
processing the read request without changing the maintained sequence ID value if the received sequence ID value equals the maintained sequence ID value, and discarding the associated read request and the sequence ID value of the associated read request if the received sequence ID value is less recent than the maintained sequence ID value.

17. A computer program product for filtering obsolete read requests by a processor device in a networked client-server architecture, the computer program product comprising a non-transitory computer-readable storage medium having computer-readable program code portions stored therein, the computer-readable program code portions comprising:
 a first executable portion that issues read requests by a client for data stored in a storage system;
 a second executable portion that mediates between the client and the storage system by a client agent;
 a third executable portion that conveys a sequence identification (ID) value by each of the read requests sent from the client agent to the storage system, wherein the read requests which are related to a specific data segment that is being read sequentially by an execution thread in the client are assigned with an identical unique sequence ID value; and
 a fourth executable portion that discards a read request having the sequence ID value that is less recent than a most recent sequence ID value already seen by the storage system.

18. The computer program product of claim 17, further including a fifth executable portion that allows for the client and the storage system to communicate in a network.

19. The computer program product of claim 18, further including a sixth executable portion that performs each of:
 allowing the client agent to reside locally relative to a respective client of the client agent, and
 mediating between the client and the storage system by the client agent by communicating with the storage system using a plurality of messages over the network.

20. The computer program product of claim 19, further including a seventh executable portion that reorders the plurality of messages while the plurality of messages are passing through the network relative to a generation order of the plurality of messages.

21. The computer program product of claim 17, further including a fifth executable portion that device maintains an order relation among sequence ID values.

22. The computer program product of claim 21, further including a sixth executable portion that generates the sequence ID values by the client agent for each one of a plurality of client read sessions, wherein each of the plurality of client read sessions is generated by a single execution thread in the client.

23. The computer program product of claim 22, further including a seventh executable portion that performs one of:
 generating the sequence ID values by the client agent for one of the plurality of client read sessions if no previous sequence ID value exists for the one of the plurality of client read sessions, and
 generating the sequence ID values by the client agent for one of the plurality of client read sessions according to one of a new sequential read flow that is initiated within the one of the plurality of client read sessions, the new sequential read flow that is identified by observing a gap in a current read flow, and observations of usage of a new identifier of a storage entity.

24. The computer program product of claim 23, further including an eighth executable portion that processes the read requests by applying one of:
 maintaining a current sequence ID value by the storage system for each one of the plurality of client read sessions, and
 for a new read request that is received and associated with a client read session:
  setting a maintained sequence ID value to be a value sent with the new read request if one of a previous sequence ID value does not exists for the one of the plurality of client read sessions, and a received sequence ID value is more recent than the maintained sequence ID value, wherein the read requests is processed,
  processing the read request without changing the maintained sequence ID value if the received sequence ID value equals the maintained sequence ID value, and
  discarding the associated read request and the sequence ID value of the associated read request if the received sequence ID value is less recent than the maintained sequence ID value.

* * * * *